(12) United States Patent
Lei et al.

(10) Patent No.: US 12,733,001 B2
(45) Date of Patent: Sep. 8, 2026

(54) MULTIPLEXING OF PUR AND SRS

(71) Applicant: QUALCOMM Incorporated, San Diego, CA (US)

(72) Inventors: Jing Lei, San Diego, CA (US); Alexandros Manolakos, Escondido, CA (US); Muhammad Sayed Khairy Abdelghaffar, San Jose, CA (US); Huilin Xu, Temecula, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 18/042,099

(22) PCT Filed: Oct. 14, 2021

(86) PCT No.: PCT/US2021/071876
§ 371 (c)(1),
(2) Date: Feb. 17, 2023

(87) PCT Pub. No.: WO2022/082205
PCT Pub. Date: Apr. 21, 2022

(65) Prior Publication Data

US 2023/0337239 A1 Oct. 19, 2023

(30) Foreign Application Priority Data

Oct. 16, 2020 (GR) .............................. 20200100624

(51) Int. Cl.
*H04W 72/21* (2023.01)
*H04L 5/00* (2006.01)
(Continued)

(52) U.S. Cl.
CPC .......... *H04W 72/21* (2023.01); *H04L 5/0051* (2013.01); *H04W 76/30* (2018.02)

(58) Field of Classification Search
CPC ..... H04W 72/21; H04W 76/30; H04W 72/23; H04L 5/0051; H04L 5/005; H04L 5/0094
See application file for complete search history.

(56) References Cited

U.S. PATENT DOCUMENTS 9,743,432 B2 8/2017 Ji et al.
11,025,348 B2 6/2021 Nam et al.
(Continued)

FOREIGN PATENT DOCUMENTS

CN 102754372 A 10/2012
CN 102934500 A 2/2013
(Continued)

OTHER PUBLICATIONS

International Search Report and Written Opinion—PCT/US2021/071876—ISA/EPO—Jan. 31, 2022.
(Continued)

*Primary Examiner* — Xuan Lu
(74) *Attorney, Agent, or Firm* — Patterson & Sheridan LLP

(57) ABSTRACT

Certain aspects of the present disclosure provide techniques for configuring sounding reference signals (SRS) resources for RRC inactive or idle UEs and multiplexing SRS with small data transmission on preconfigured uplink resources (PUR) An example method by a user equipment (UE) generally includes receiving signaling configuring the UE with SRS resources, QCL relationship, power control and timing advance information for SRS transmissions, and transmitting SRS in conjunction with one or more of the PUR occasions in accordance with the configuration and signaling.

28 Claims, 16 Drawing Sheets

(51) Int. Cl.

*H04W 72/23* (2023.01)
*H04W 76/30* (2018.01)

(56) References Cited

U.S. PATENT DOCUMENTS

| | | | | |
|---|---|---|---|---|
| 2020/0267730 | A1* | 8/2020 | Kim | H04W 72/0453 |
| 2021/0022143 | A1* | 1/2021 | Xiong | H04L 5/10 |
| 2022/0022229 | A1* | 1/2022 | Wong | H04W 72/20 |
| 2022/0030620 | A1* | 1/2022 | Cirik | H04W 52/0216 |
| 2022/0046522 | A1* | 2/2022 | Kim | H04W 76/34 |
| 2022/0053450 | A1* | 2/2022 | Khoryaev | H04L 5/0048 |
| 2022/0086899 | A1* | 3/2022 | Shih | H04L 5/0053 |
| 2022/0123885 | A1* | 4/2022 | Shin | H04W 72/0446 |
| 2022/0377619 | A1* | 11/2022 | Grant | H04L 5/0044 |

FOREIGN PATENT DOCUMENTS

| | | | |
|---|---|---|---|
| WO | 2015042594 | A2 | 3/2015 |
| WO | 2019161070 | | 8/2019 |
| WO | 2020091570 | A1 | 5/2020 |
| WO | 2020164816 | A1 | 8/2020 |

OTHER PUBLICATIONS

Rapporteur, D., (Blackberry): "RAN2 Agreements for Rel-16 Additional Enhancements for NB-IoT and MTC", 3GPP Draft, 3GPP TSG-RAN WG2 Meeting #109_e, R2-2001886, 3rd Generation Partnership Project (3GPP), Mobile Competence Centre, 650, Route Des Lucioles, F-06921 Sophia-Antipolis Cedex, France, vol. RAN WG2, No. Feb. 24, 2020-Mar. 6, 2020, Mar. 15, 2020, XP051867032, 43 Pages, 2.4 Transmission in Preconfigured Resources 1.1 Coexistence with NR, Paragraph [02.4].

Jun Z., et al., "China Excellent Master's Thesis Full-Text Database (Electronic Journal), Information Technology Edition", Design of Uplink Detection Reference Signals in CoMP Systems, Jul. 15, 2011, 74 Pages, The Whole Document.

* cited by examiner

MONITOR FOR SRS IN CONJUNCTION WITH ONE OR MORE OF THE PUR OCCASIONS IN ACCORDANCE WITH THE CONFIGURATION

MULTIPLEXING OF PUR AND SRS

This application is a national stage application under 35 U.S.C. 371 of PCT/US2021/071876, filed Oct. 14, 2021, which claims benefit of and priority to Greek Provisional Application No. 20200100624, filed Oct. 16, 2020, which are hereby assigned to the assignee hereof and hereby expressly incorporated by reference herein in their entireties as if fully set forth below and for all applicable purposes.

CROSS-REFERENCE TO RELATED APPLICATION(S)

This application claims benefit of and priority to Greek Provisional Application No. 20200100624, filed Oct. 16, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for multiplexing preconfigured uplink resources (PUR) and sounding reference signals (SRS).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure may provide advantages, such as improved energy efficiency.

Certain aspects provide a method for wireless communication by a user equipment (UE). The method generally includes receiving signaling configuring the UE with resources for pre-configured uplink resource (PUR) occasions and with resources for sounding reference signal (SRS) transmissions, and transmitting SRS in conjunction with one or more of the PUR occasions in accordance with the configuration.

Certain aspects provide a method for wireless communication by a network entity. The method generally includes sending a UE signaling configuring the UE with resources for PUR occasions and with resources for SRS transmissions, and monitoring for SRS in conjunction with one or more of the PUR occasions in accordance with the configuration.

Certain aspects of the subject matter described in this disclosure can be implemented in an apparatus for wireless communication by a UE. The apparatus generally includes at least one processor, and a memory coupled to the at least one processor, the memory comprising code executable by the at least one processor to cause the UE to receive signaling configuring the UE with resources for pre-configured uplink resource (PUR) occasions and with resources for sounding reference signal (SRS) transmissions, and to transmit SRS in conjunction with one or more of the PUR occasions in accordance with the configuration.

Certain aspects of the subject matter described in this disclosure can be implemented in an apparatus for wireless communication by a network entity. The apparatus generally includes at least one processor, and a memory coupled to the at least one processor, the memory comprising code executable by the at least one processor to cause the network entity to send a UE signaling configuring the UE with resources for PUR occasions and with resources for SRS transmissions, and to monitor for SRS in conjunction with one or more of the PUR occasions in accordance with the configuration.

Certain aspects of the subject matter described in this disclosure can be implemented in an apparatus for wireless communication by a UE. The UE generally includes means for receiving signaling configuring the UE with resources for pre-configured uplink resource (PUR) occasions and with resources for sounding reference signal (SRS) transmissions, and means for transmitting SRS in conjunction with one or more of the PUR occasions in accordance with the configuration.

Certain aspects of the subject matter described in this disclosure can be implemented in an apparatus for wireless communication by a network entity. The network entity generally includes means for sending a UE signaling configuring the UE with resources for PUR occasions and with resources for SRS transmissions, and means for monitoring for SRS in conjunction with one or more of the PUR occasions in accordance with the configuration.

Certain aspects of the subject matter described in this disclosure can be implemented in a computer readable medium storing computer executable code thereon for wireless communication by a UE. The computer readable medium generally includes code for receiving signaling configuring the UE with resources for pre-configured uplink resource (PUR) occasions and with resources for sounding reference signal (SRS) transmissions, and code for transmitting SRS in conjunction with one or more of the PUR occasions in accordance with the configuration.

Certain aspects of the subject matter described in this disclosure can be implemented in a computer readable medium storing computer executable code thereon for wireless communication by a network entity. The computer readable medium generally includes code for sending a UE signaling configuring the UE with resources for PUR occasions and with resources for SRS transmissions, and code for monitoring for SRS in conjunction with one or more of the PUR occasions in accordance with the configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates an example of a frame format for a telecommunication system, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
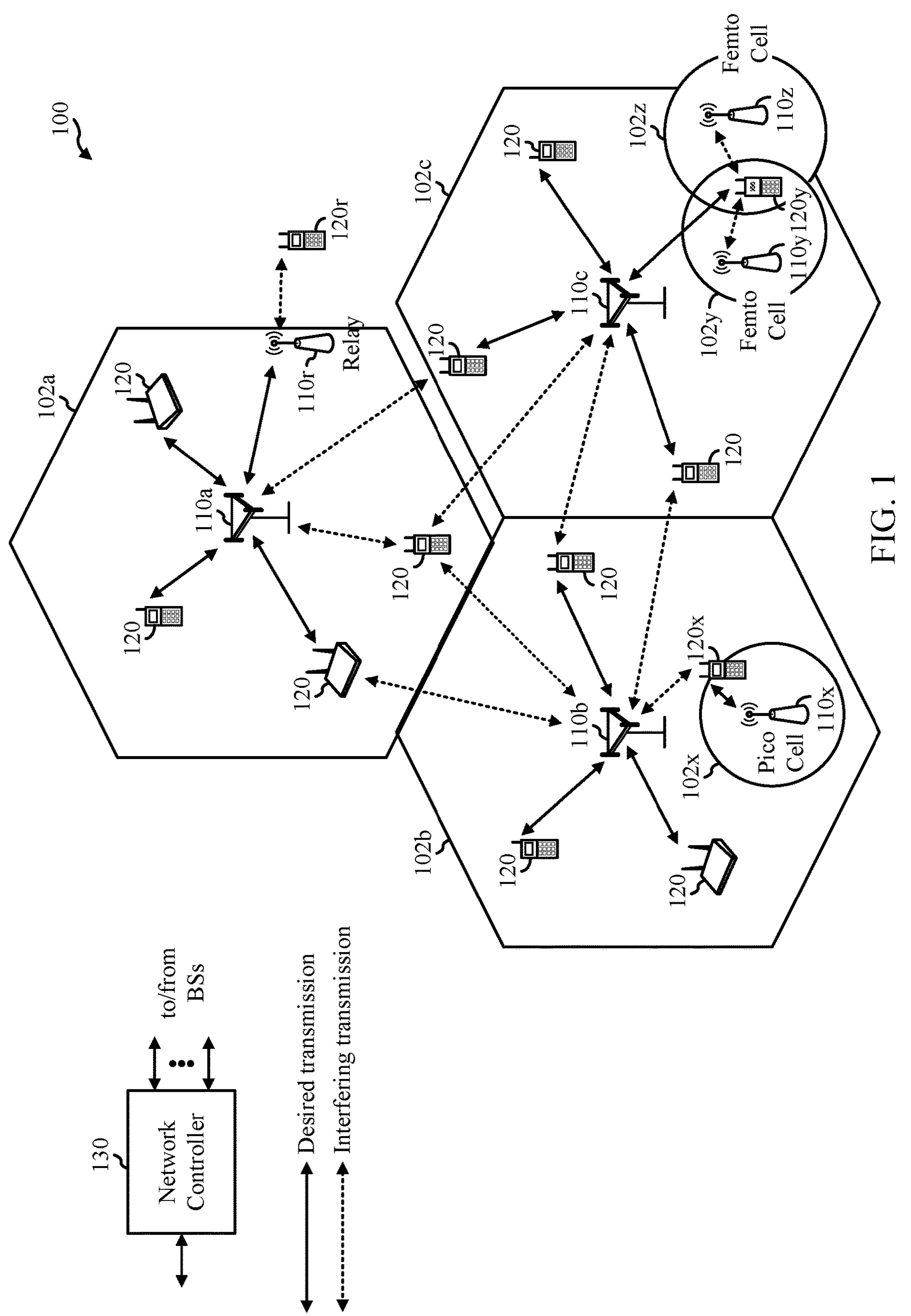
FIG. 1 is a block diagram conceptually illustrating an example telecommunications system, in accordance with certain aspects of the present disclosure.

Aspects of the present disclosure relate to wireless communications, and more particularly, to techniques for multiplexing preconfigured uplink resources (PUR) and sounding reference signals (SRS). The SRS transmissions may help, for example, with small data transfer (SDT) supported by a UE in a non-connected mode (e.g., idle or inactive).

One objective of wireless communication networks, such as new radio (NR) networks, is that they be scalable and deployable in an efficient and cost-effective way. To facilitate scalability, a new UE type with reduced capabilities (RedCap) has been introduced. A RedCap UE may exhibit a general relaxation of peak throughput, as well as lower latency requirements. This may include scalable resource allocation, coverage enhancement, and power saving.

To facilitate the enhanced scalability for RedCap UEs, aspects of the present disclosure provide techniques for multiplexing preconfigured uplink resources (PUR) and sounding reference signals (SRS). PUR mechanisms can assign radio resources to a UE for transmission without the need of connection setup, reducing latency. PUR may also enhance SRS-assisted tracking, channel sounding/positioning, and/or beam association.

The SRS may increase reliability of small data transfer (SDT) for UEs in non-connected modes, which may in turn help a UE meet NR RedCap reliability requirements. This may enhance UE performance by allowing a base station to track variations in uplink timing offset and/or perform link adaptation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 may be configured to perform operations 1100 of FIG. 11 to multiplex preconfigured uplink resources (PUR) occasions with sounding reference signals (SRS), in accordance with various aspects discussed herein. Similarly, a base station 110 may be configured to perform operations 1200 of FIG. 12 to configure and monitor for SRS multiplexed with PUR occasions, from a UE (e.g., performing operations 1200 of FIG. 12).

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
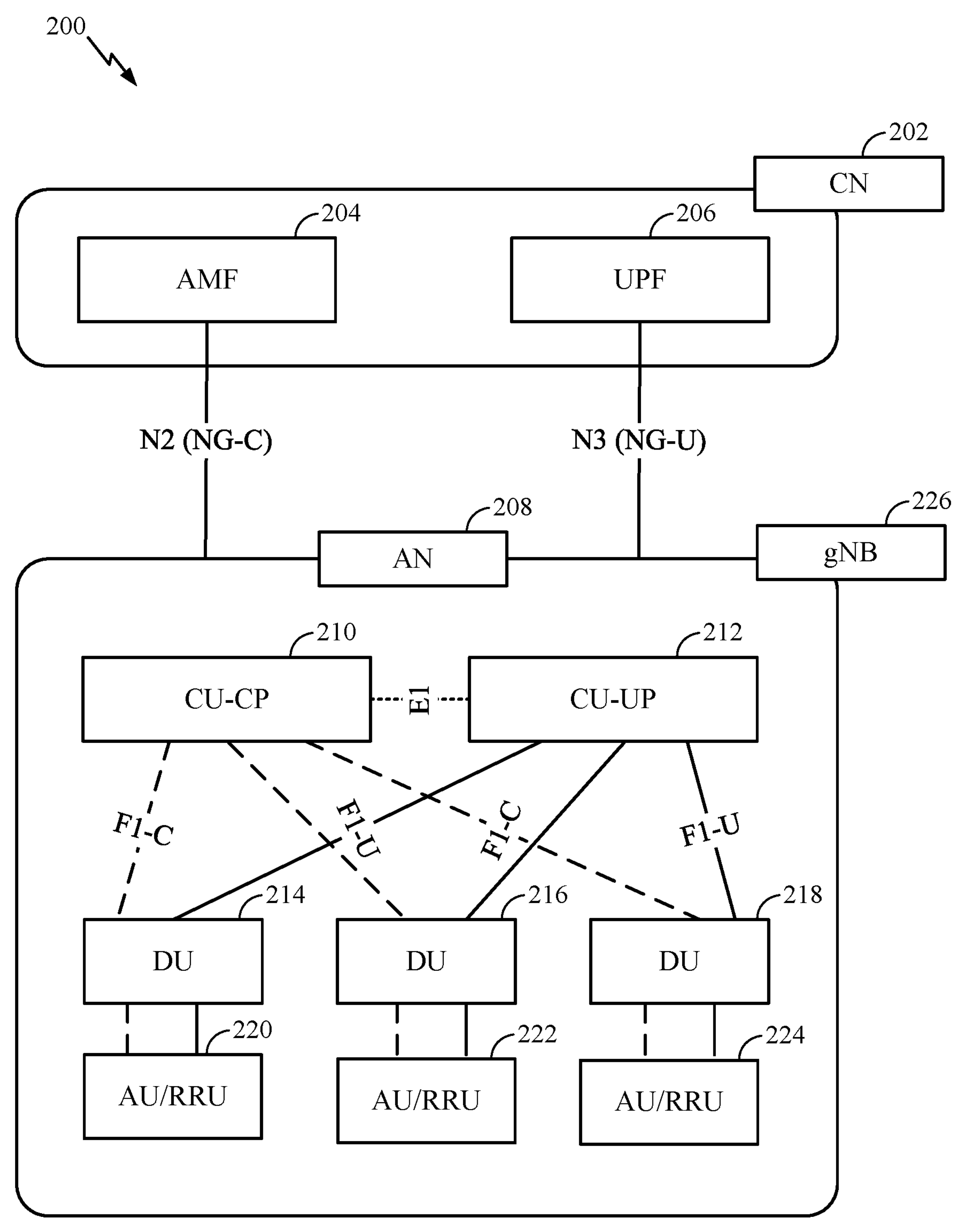
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via an Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
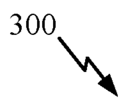
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
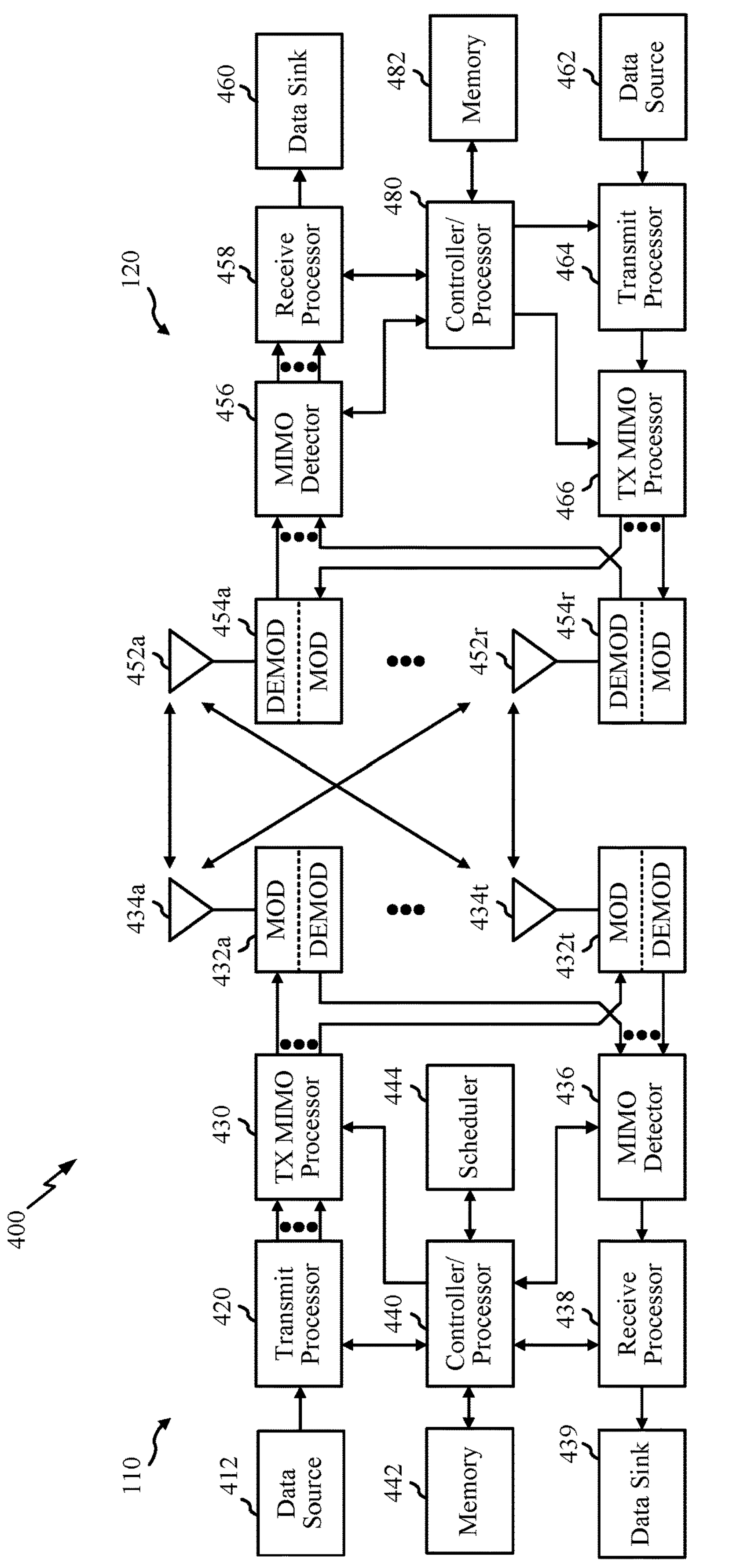
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be configured to perform the operations described with respect to FIG. 11, while similar processors of BS 110 may perform operations described with respect to FIG. 12.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) **432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432***a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
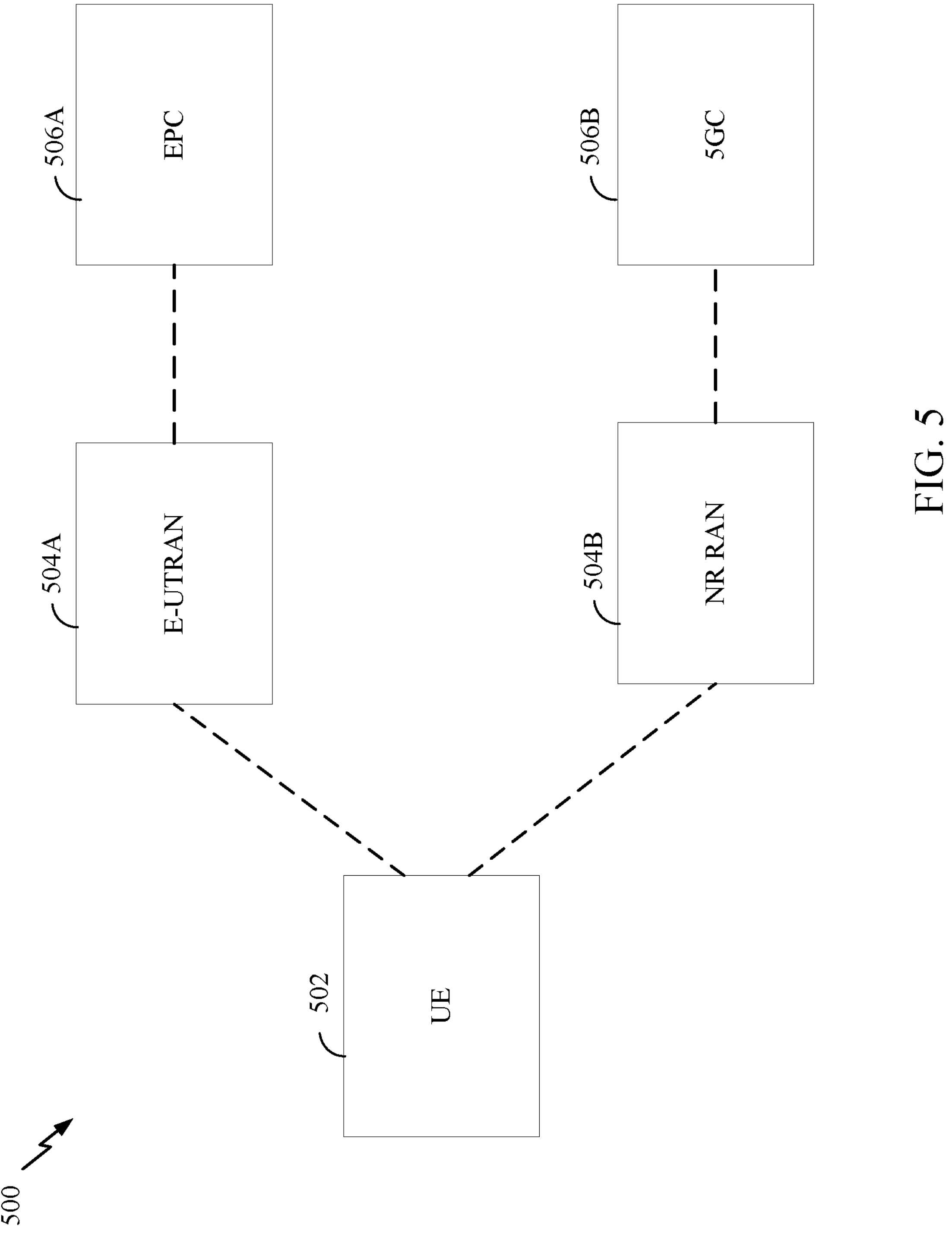
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
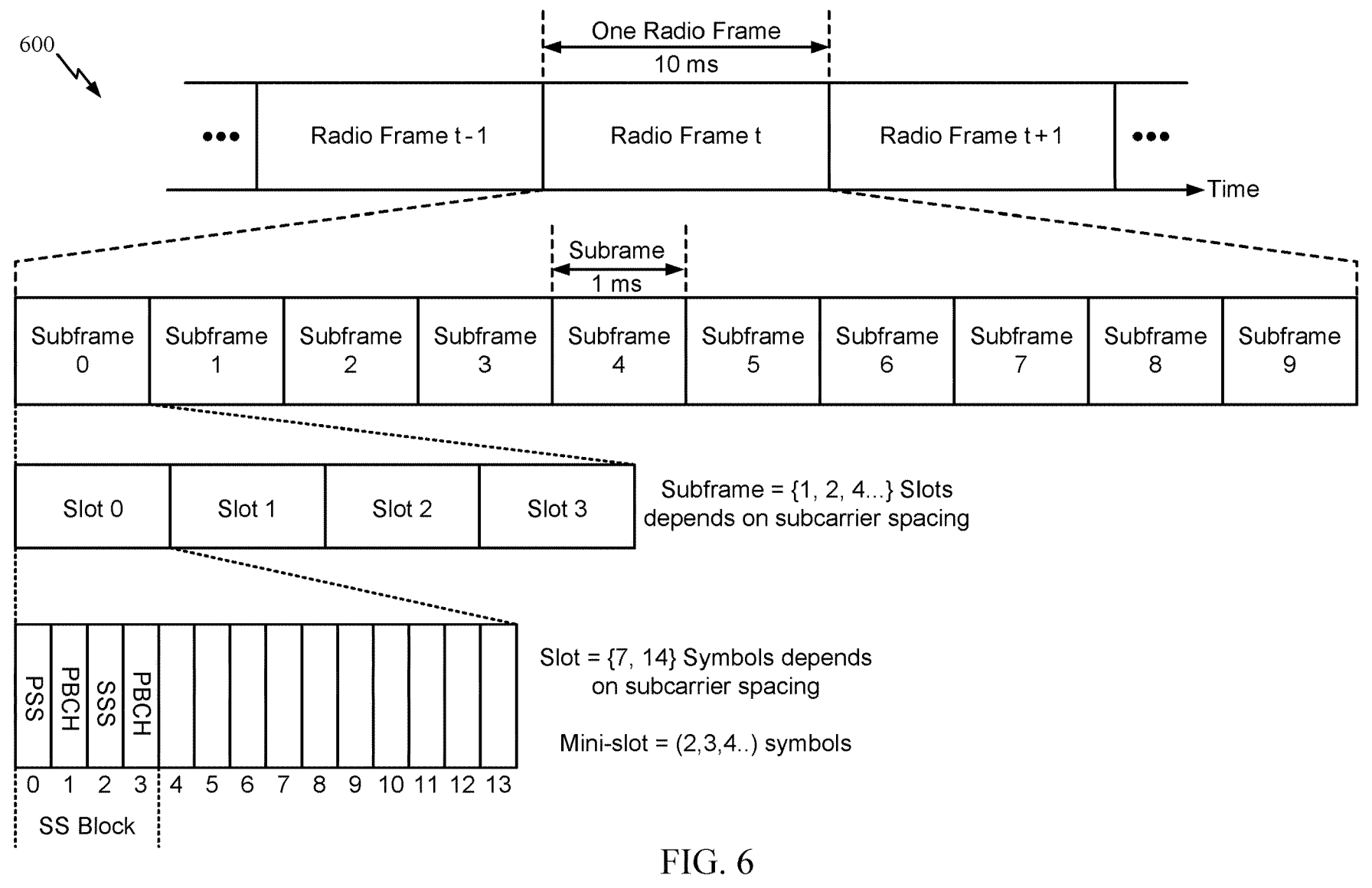

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 7:
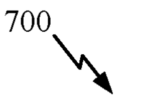
FIG. 7 is a timing diagram illustrating an example four-step RACH procedure, in accordance with certain aspects of the present disclosure.
Figure 7:
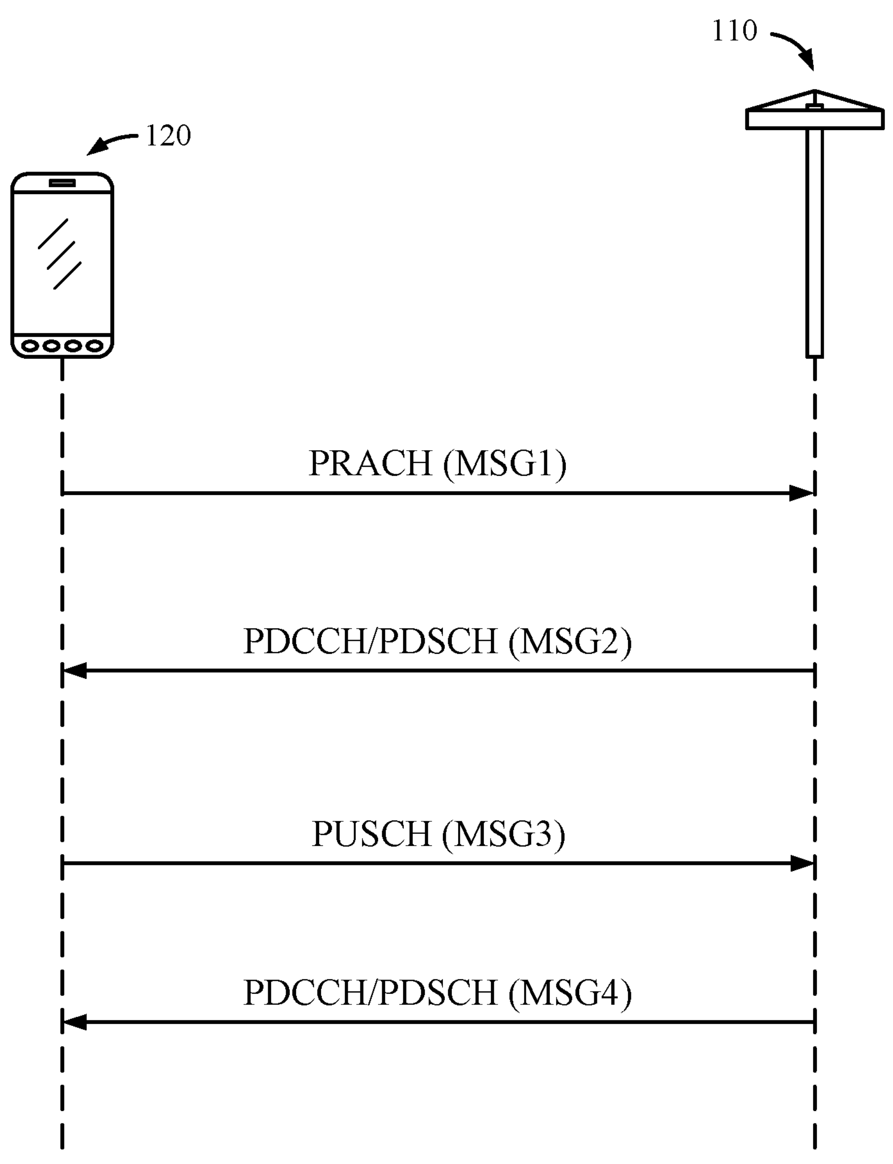

FIG. 7 is a timing (or "call-flow") diagram 700 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

Figure 8:
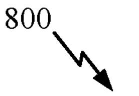
FIG. 8 is a timing diagram illustrating an example two-step RACH procedure, in accordance with certain aspects of the present disclosure.
Figure 8:
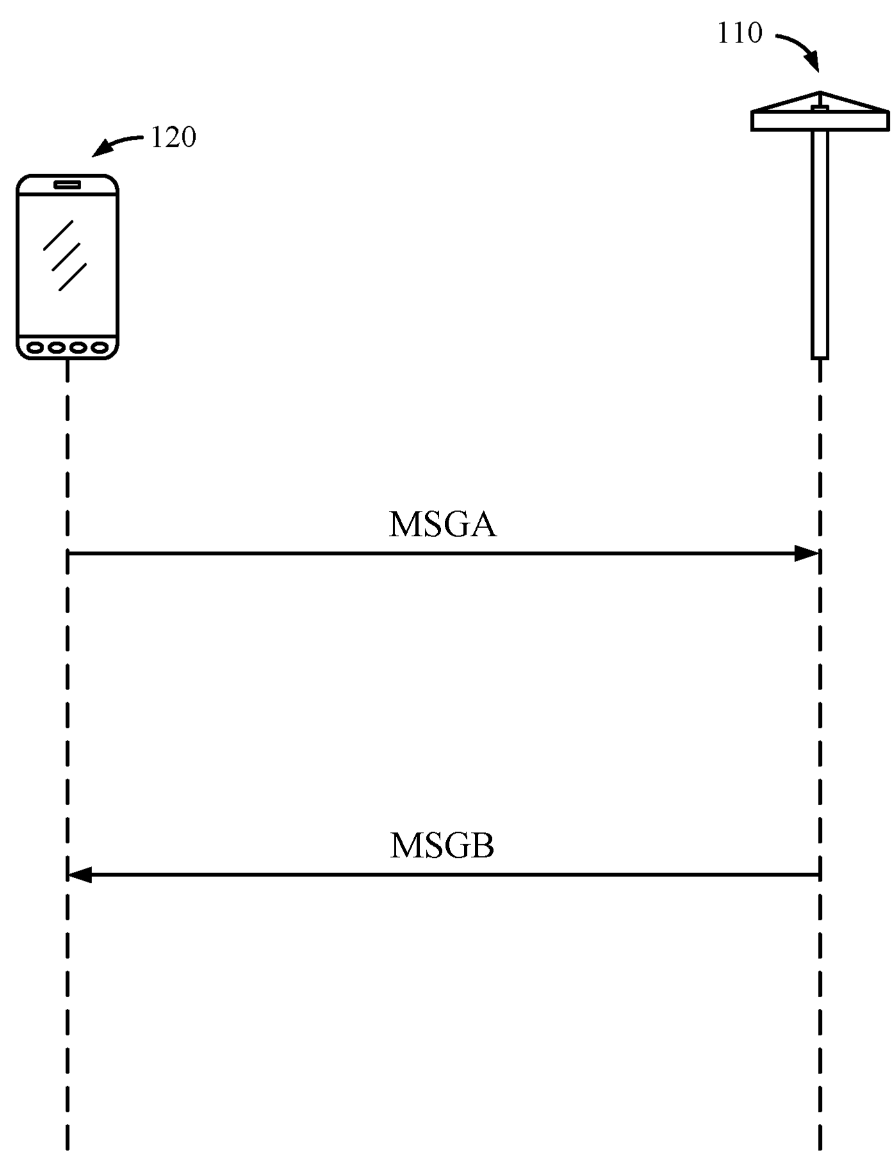

FIG. 8 is a timing diagram 800 illustrating an example two-step RACH procedure, in accordance with certain aspects of the present disclosure. A first enhanced message (msgA) may be sent from the UE 120 to BS 110. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 110 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:

(1) selection of a preamble sequence; and (2) selection of a preamble occasion in time/frequency domain (for transmitting the selected preamble sequence).

The msgA payload transmission generally involves:

(1) construction of the random access message payload (DMRS/PUSCH); and (2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for a msgA transmission. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exist a strong desire for new radio (NR) to be scalable and deployable in a more efficient and cost-effective way. Thus, a new UE type with reduced capabilities (RedCap) has been introduced. In particular, a RedCap UE may exhibit a general relaxation of peak throughput, as well as lower latency and/or reliability requirements.

Figure 9:
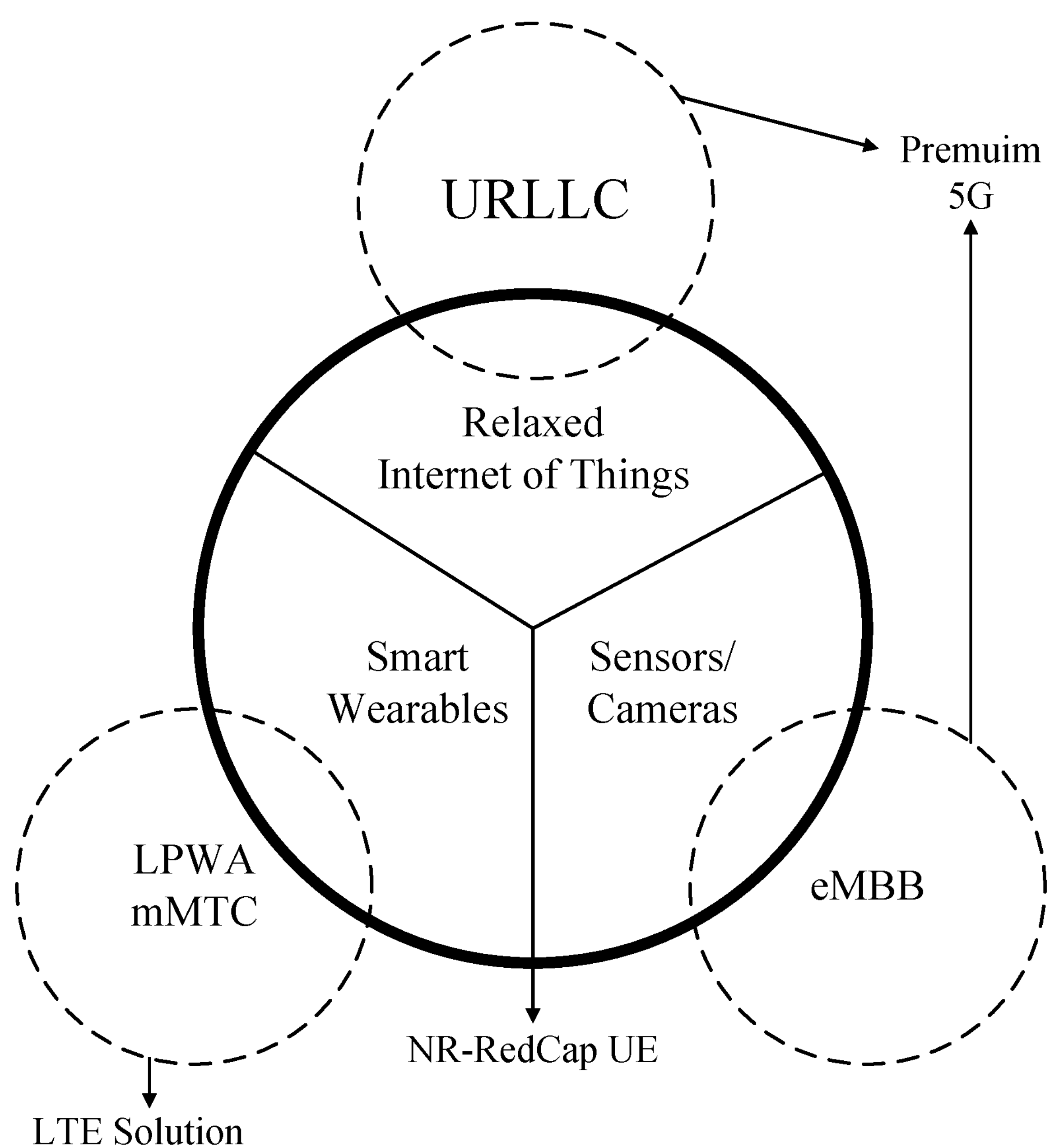
FIG. 9 is a diagram illustrating example functionality of reduced capability (RedCap) user equipments (UEs), in accordance with certain aspects of the present disclosure.

Thus, some design objectives of the NR RedCap UE may include scalable resource allocation, coverage enhancement for DL and/or UL, power saving in all RRC states, and/or co-existence with the NR premium UE. As shown in FIG. 9, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G)

devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example Multiplexing PUR and SRS

Aspects of the present disclosure provide techniques for multiplexing preconfigured uplink resources (PUR) and sounding reference signals (SRS). The SRS may help increase reliability of small data transfer (SDT) for UEs in non-connected modes, for example, allowing a gNB to track variations in uplink timing offset and/or perform link adaptation.

PUR (introduced in Release 16) generally refers to a mechanism that assigns radio resources to a UE in advance for transmission of uplink data, without the need of connection setup. In general, a group of PUR occasions can be configured by a gNB in the time, frequency, and/or spatial domain, each of which being associated with beamformed downlink (DL) reference signals (RSs) (e.g., synchronization signal block (SSB), channel state information (CSI) reference signals (RS), etc.). A gNB may use certain parameters (e.g., ConfiguredGrantConfig, rrc-ConfiguredUplinkGrant, srs-ResourceIndicator, repK, NR-U parameters) to configure a PUR.

As described further below with respect to FIG. 10, transmission (TX) and/or reception (RX) beam correspondence may be assumed in a PUR occasion configuration.

PUR occasions can be periodically configured based on look-up tables (LUTs) or closed-form formulas, which can be parameterized based on PUR occasion periodicity (e.g., in a slot or subframe), a slot/symbol offset of the PUR occasion (e.g., in a subcarrier spacing (SCS) of an active UL bandwidth part (BWP)), and/or a time duration of the PUR occasion. When PUR occasions are associated with an SSB or periodic CSI-RS beams, a period (e.g., a PUR to SSB or CSI-RS association period or association pattern period) can be introduced to ensure a relatively uniform mapping of PUR occasions to different reception beams. In some cases, one SSB-to-PUR association pattern period can include one or multiple SSB-to-PUR association periods. In some cases, one SSB-to-PUR association period can include one or multiple PUR configuration periods. In some cases, one PUR configuration period can be an integer multiple of SSB or CSI-RS burst periods.

Figure 10:
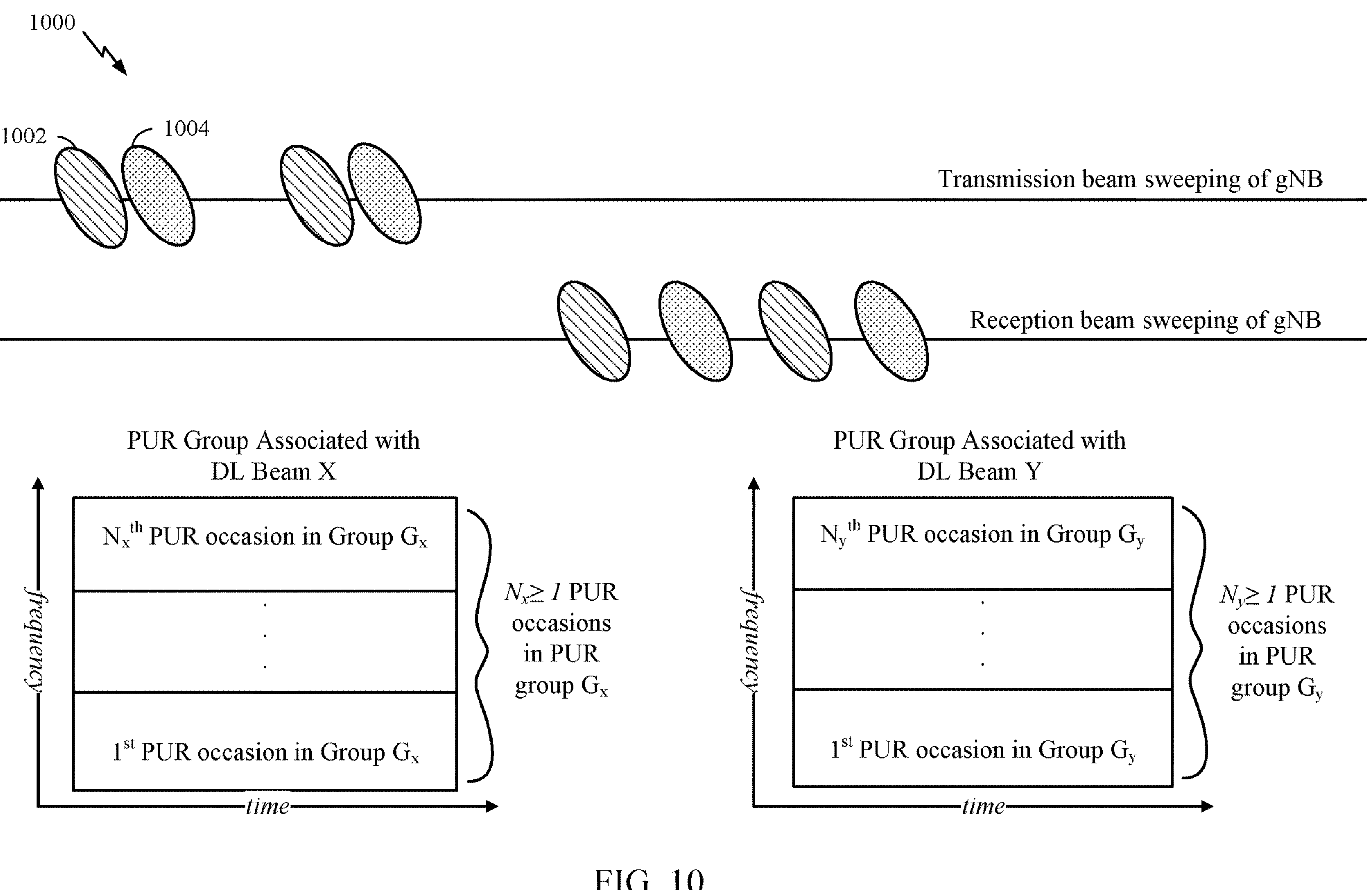
FIG. 10 is a diagram illustrating beam association for a preconfigured uplink resource (PUR) group, in accordance with certain aspects of the present disclosure.

FIG. 10 is a diagram 1000 illustrating beam association for a PUR group. As illustrated, one PUR group can include one or multiple PUR occasions. As illustrated, for receiving UL transmissions from a particular PUR group, a gNB may use an uplink beam corresponding to a downlink beam (e.g., used for transmitting downlink reference signals (CSI-RS and/or SSB). For example, for a DL beam X 1002 of a serving gNB, the gNB uses the same beam for receiving UL transmissions from PUR group $G_X$. Similarly, for a DL beam Y 1004 of the serving gNB, the gNB uses the same beam in receiving UL transmissions from PUR group $G_Y$.

Certain aspects provide techniques for multiplexing PUR occasions and SRS (e.g., for SDT). For example, certain aspects may allow for SRS-assisted tracking area (TA) tracking, channel sounding/positioning, and/or beam association (e.g., between channel state information (CSI) reference signals (RS) and/or synchronization signal block (SSB) and PUR/SRS).

Where techniques for multiplexing PUR occasions and SRS are implemented for channel sounding/positioning, a UE may transmit SRS for UL and DL positioning while in an inactive state. Spatial relation as defined in Release-16 for transmission of SRS for positioning by RRC_CONNECTED UEs may also be applied to RRC_INACTIVE UEs. Inactive state positioning may occur under certain validation criteria. The SRS transmitted for positioning may be periodic, semi-persistent, or aperiodic. In one example, where the SRS is periodic and configured for a deferred mobile terminal location request (MT-LR) positioning procedure, the gNB may configure the UE with SRS using certain inactive state validation criteria (i.e., RRCRelease with suspendConfig).

Furthermore, aspects described herein may provide for enabling a network entity (e.g., a gNB) to track variation of uplink (UL) timing offset, obtain a CSI report to perform link adaptation, and/or calculate one or more position related metrics (e.g., UL time difference of arrival (TDOA) and/or angle of arrival AoA) for an inactive/idle UE (e.g., with low mobility).

Figure 11:
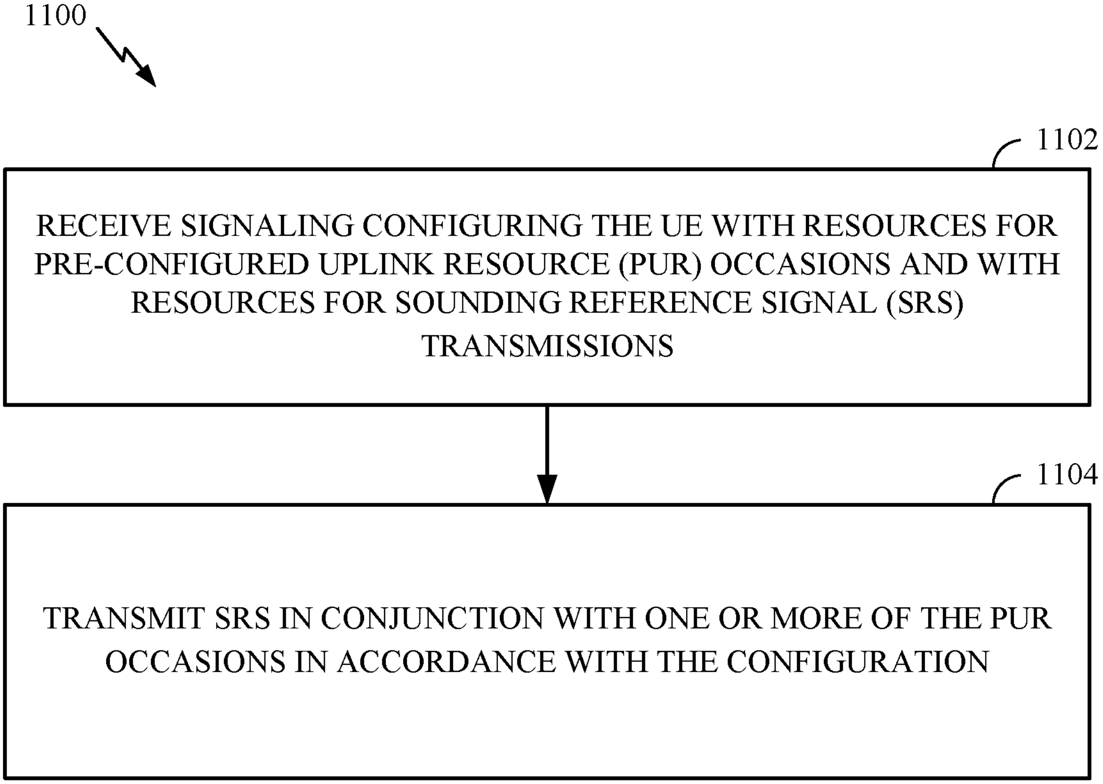
FIG. 11 is a flow diagram illustrating example operations for wireless communication by a UE, in accordance with certain aspects of the present disclosure.

FIG. 11 illustrates example operations 1100 for wireless communication by a user equipment (UE). The operations 1100 may be performed, for example, by a UE (e.g., such as a UE 120*a* in the wireless communication network 100) to multiplex PUR and SRS, in accordance with certain aspects of the present disclosure.

Operations 1100 begin, at 1102, by receiving signaling configuring the UE with resources for PUR occasions and with resources for SRS transmissions. The signaling could be received via a single message (e.g., with different fields) or configured by separate messages. Further, separate periodicities may be configured for PUR occasions and SRS transmissions (e.g., such that SRS is multiplexed in only some PUR occasions).

Figures 14A, 14B, 14C:
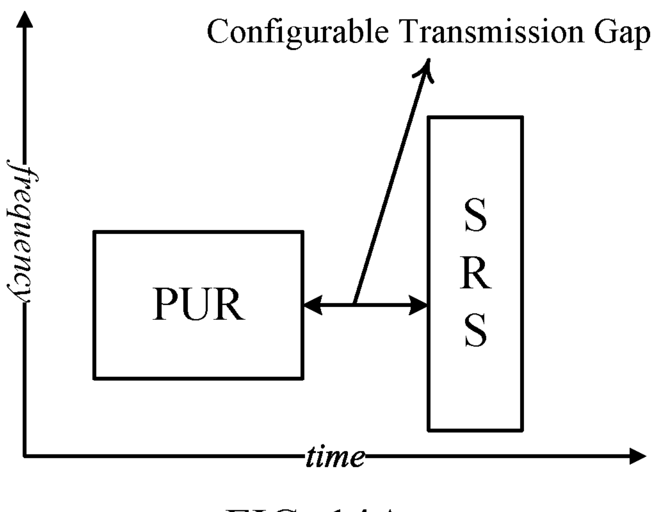
FIGS. 14A-14C illustrate different mechanisms for multiplexing SRS with PUR occasions, in accordance with certain aspects of the present disclosure.

At 1104, the UE transmits SRS in conjunction with one or more of the PUR occasions in accordance with the configuration. For example, as shown in FIGS. 14A-14B, the SRS may be sent using time division multiplexing, with a (configurable) transmission gap between a PUR occasion and the SRS transmission or SRS may be sent using frequency division multiplexing, on overlapping time resources, as shown in FIG. 14C.

Figure 12:
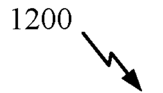
FIG. 12 is a flow diagram illustrating example operations for wireless communication by a network entity, in accordance with certain aspects of the present disclosure.
Figure 12:
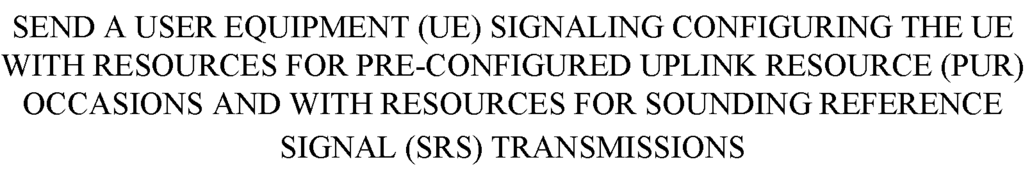

FIG. 12 illustrates example operations 1200 for wireless communication by a network entity and may be considered complementary to operations 1100 of FIG. 11. For example, operations 1200 may be performed by a BS 110 (e.g., a gNB) to process SRS multiplexed with PUR occasions, from a UE performing operations 1100 of FIG. 11.

Operations 1200 begin, at 1202, sending a UE signaling configuring the UE with resources for PUR occasions and with resources for SRS transmissions.

At 1204, the network entity monitors for SRS in conjunction with one or more of the PUR occasions in accordance with the configuration.

Figure 13:
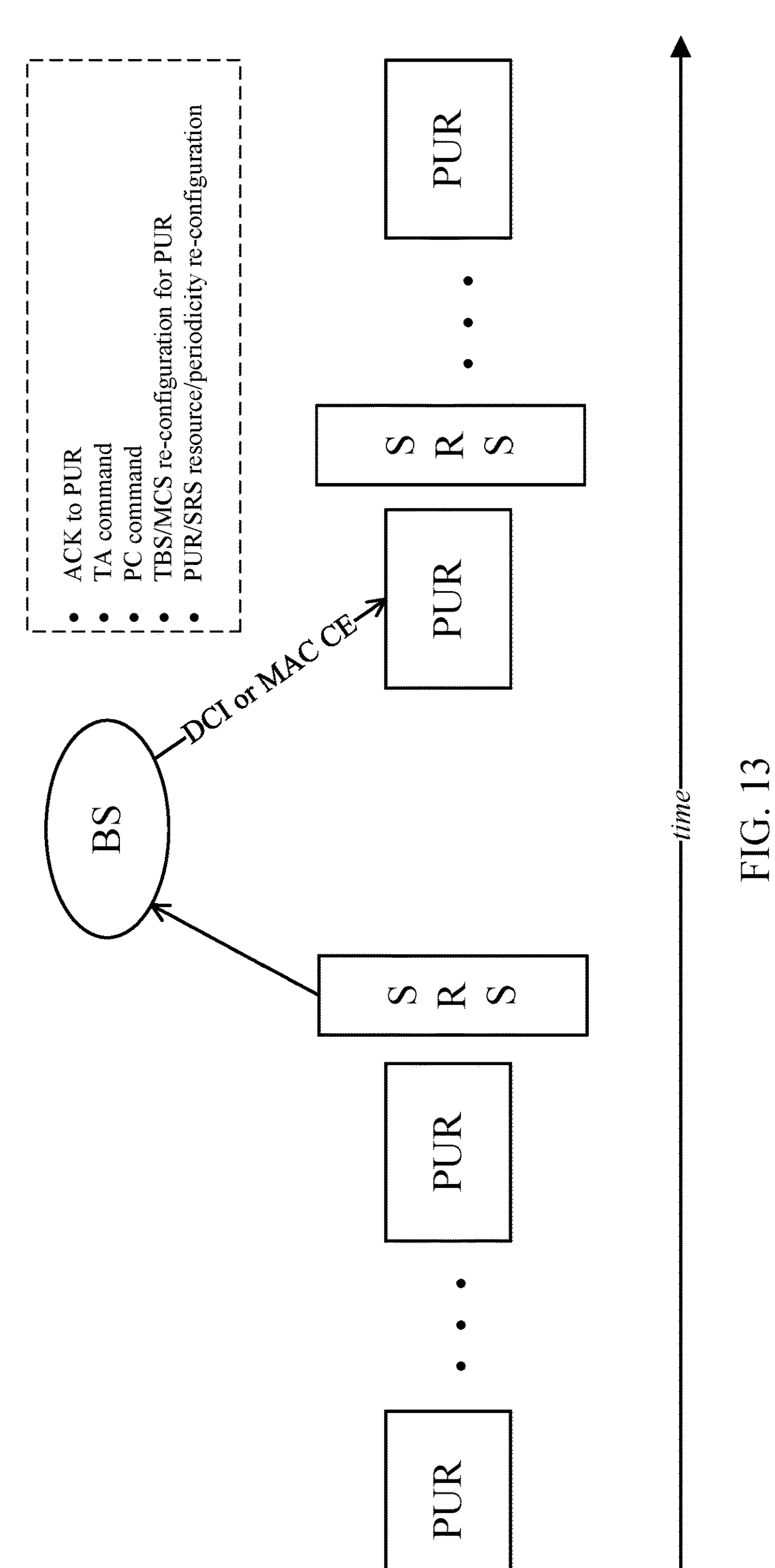
FIG. 13 is an example of multiplexing sounding reference signals (SRS) with PUR occasions, in accordance with certain aspects of the present disclosure.

FIG. 13 is an example timeline for multiplexing sounding reference signals (SRS) with PUR occasions (e.g., for a UE in idle/inactive modes), in accordance with certain aspects of the present disclosure. As shown, PUR occasions may occur periodically, and a UE may multiplex SRS with one or more of the PUR occasions. The SRS may assist a gNB with timing advance (TA) tracking, positioning, and/or link adaptation. As illustrated, SRS may help increase reliability of various transmissions, such as acknowledgements (ACKs) to PUR, TA commands, power control (PC) commands, transport block size (TBS) and/or modulation and coding scheme (MCS) reconfiguration for PUR, and/or PUR/SRS resource/periodicity (re)configuration).

Resource (re)configuration for PUR and/or SRS can be done by dedicated radio resource control RRC signaling (e.g., when the UE is in connected state), an RRC release message, media access control (MAC) control element (CE), and/or downlink control information (DCI).

In certain aspects, the SRS may be quasi co-located (e.g., QCL'd) with the PUR. Resources/signals may be considered QCL'd if properties of the channel over which one is conveyed can be inferred from the channel over which the other is conveyed. In some cases, a TX beam for SRS and/or PUR can be associated with RX beams of an SSB or a CSI-RS (e.g., which may be scheduled for an RRC idle/inactive UE.)

According to certain aspects, the QCL relationship between SRS and PUR can be configured in the PUR configuration message. In this case, the PUR configuration message can be sent by a BS via dedicated RRC signaling (e.g., when UE is in connected state), an RRC release message, or via MAC CE (e.g., msg4/msgB of a random access channel (RACH) procedure). Spatial relation defined in Rel.16 for transmission of SRS for positioning by RRC-_CONNECTED UEs is applicable for RRC_INACTIVE UEs.

In certain aspects, as shown in FIGS. 14A-14C, the SRS may be multiplexed with the PUR in the frequency domain and/or time domain. Furthermore, as shown in FIGS. 14A and 14B, there can exist a configurable transmission gap when the PUR and SRS are multiplexed in the time domain. As illustrated in FIG. 14C, PUR and SRS may be sent simultaneously (overlapping in time domain), using frequency division multiplexing (FDM).

In certain aspects, the UE can request (e.g., an "on-demand request") for SRS resources multiplexed with PUR transmission occasion. In this case, the UE's request for multiplexed SRS can be part of the PUR configuration request or a re-configuration request. In one example, SRS resources multiplexed with PUR transmission occasion may be implemented on-demand for channel sounding/positioning. The UE's on-demand request for multiplexed SRS can be transmitted on PUSCH, PUCCH, or UCI multiplexed on the PUSCH.

In some cases, upon receiving the UE's request for SRS, the gNB can acknowledge (or decline) the request. In this case, the gNB can signal the scheduling decision for SRS in a PUR configuration message or re-configuration message. For example, the PUR configuration/re-configuration message can be sent by the gNB in dedicated RRC signaling (e.g., when UE is in connected state), a RRC release message, or MAC CE of (e.g., msg4/msgB of a RACH procedure).

Figure 15:
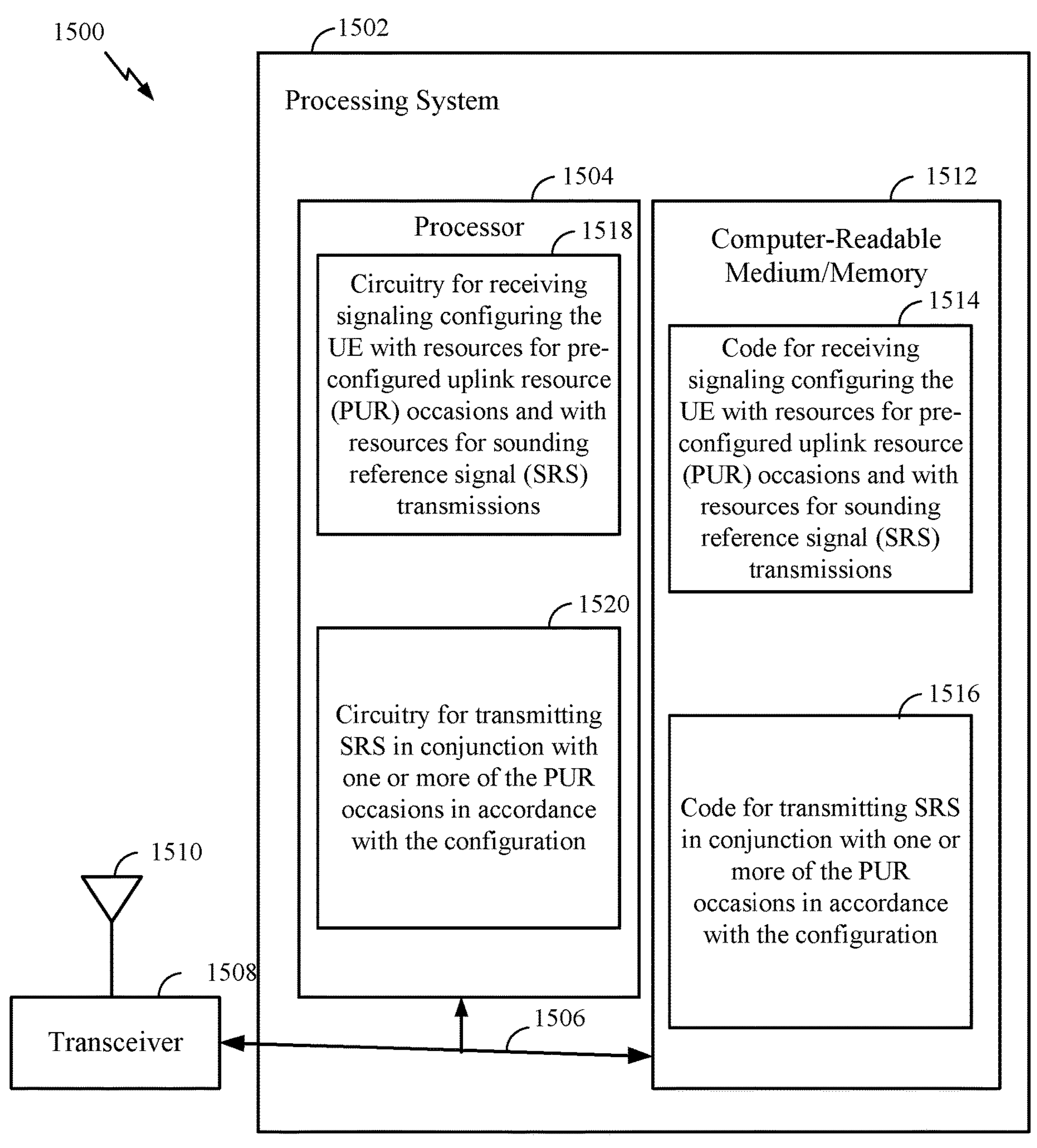
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 11, or other operations for performing the various techniques discussed herein. In certain aspects, computer-readable medium/memory 1512 stores code 1514 for receiving signaling configuring the UE with resources for PUR occasions and with resources for SRS transmissions; and code 1516 for transmitting SRS in conjunction with one or more of the PUR occasions in accordance with the configuration. In certain aspects, the processor 1504 has circuitry configured to implement the code stored in the computer-readable medium/memory 1512. The processor 1504 includes circuitry 1518 for receiving signaling configuring the UE with resources for PUR occasions and with resources for SRS transmissions; and circuitry 1520 for transmitting SRS in conjunction with one or more of the PUR occasions in accordance with the configuration.

Figure 16:
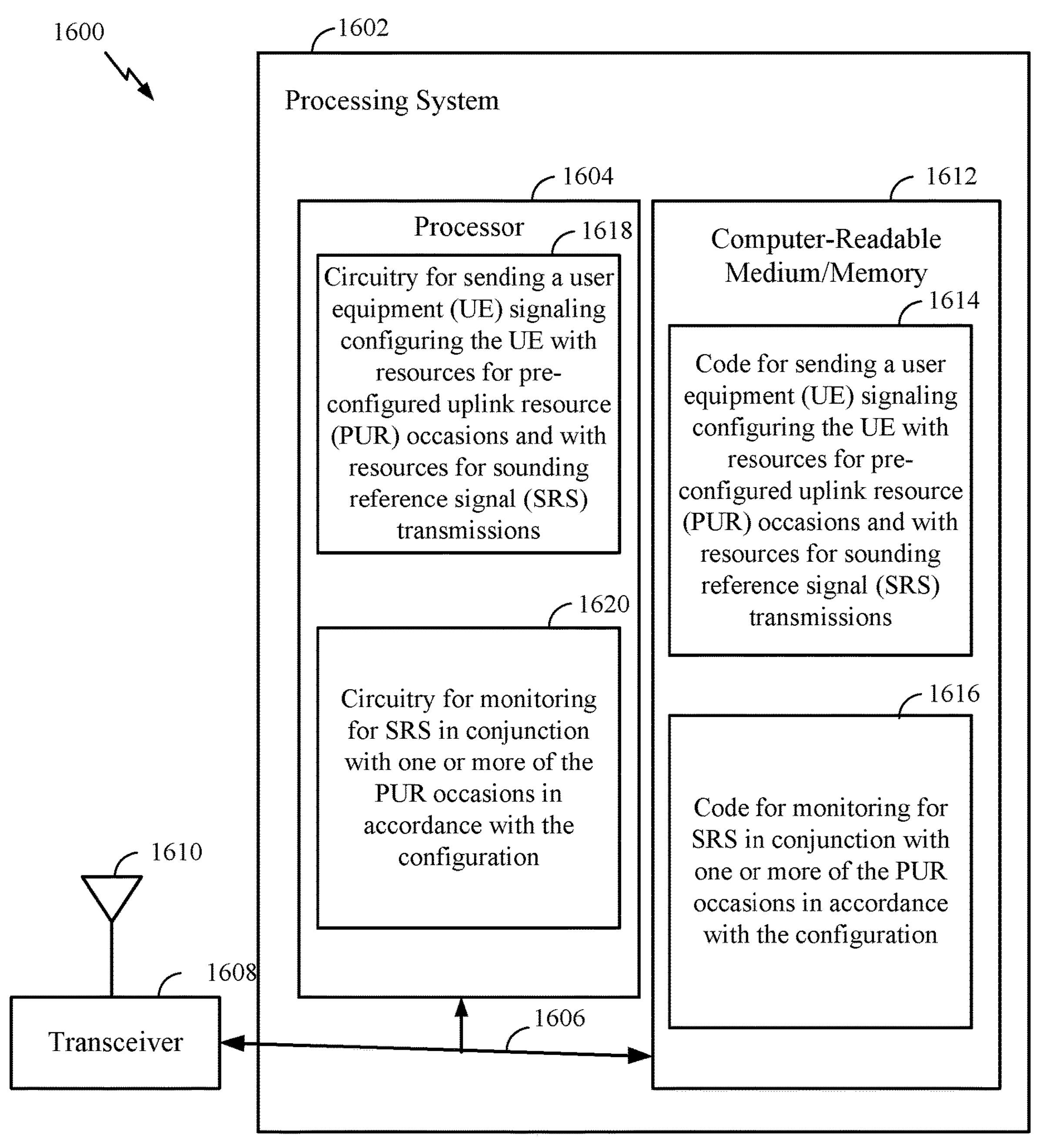
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 12. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 12, or other operations for performing the various techniques discussed herein. In certain aspects, computer-readable medium/memory 1612 stores code 1614 for sending a UE signaling configuring the UE with resources for PUR occasions and with resources for SRS transmissions; and code 1616 for monitoring for SRS in conjunction with one or more of the PUR occasions in accordance with the configuration. In certain aspects, the processor 1604 has circuitry configured to implement the code stored in the computer-readable medium/memory 1612. The processor 1604 includes circuitry 1618 for sending a UE signaling configuring the UE with resources for PUR occasions and with resources for SRS transmissions; and circuitry 1620 for monitoring for SRS in conjunction with one or more of the PUR occasions in accordance with the configuration.

EXAMPLE ASPECTS

Aspect 1: An apparatus for wireless communications performed by a user equipment (UE), comprising a memory and at least one processor coupled to the memory, the memory and the at least one processor being configured to receive signaling configuring the UE with resources for pre-configured uplink resource (PUR) occasions and with resources for sounding reference signal (SRS) transmissions, and transmit SRS in conjunction with one or more of the PUR occasions in accordance with the configuration.

Aspect 2: The apparatus of Aspect 1, wherein the SRS transmissions are multiplexed with data transmitted in the PUR occasions while the UE is an idle or inactive mode.

Aspect 3: The apparatus of Aspect 2, wherein SRS transmissions are multiplexed in the time domain.

Aspect 4: The apparatus of any one of Aspect 2 or 3, wherein the signaling further configures the UE with a transmission time gap between the PUR occasions and the SRS transmissions.

Aspect 5: The apparatus of any one of Aspects 2-4, wherein SRS transmissions are multiplexed in the frequency domain.

Aspect 6: The apparatus of any one of Aspects 1-5, wherein periodicities of the PUR occasions and SRS resources are configured separately.

Aspect 7: The apparatus of any one of Aspects 1-6, wherein the apparatus is further configured to receive signaling reconfiguring at least one of the resources for PUR occasions or the resources for SRS transmission.

Aspect 8: The apparatus of any one of Aspects 1-7, wherein at least one of signaling configuring the UE or the signaling reconfiguring the UE comprises dedicated radio resource control (RRC) signaling or an RRC release message.

Aspect 9: The apparatus of any one of Aspects 1-8, wherein at least one of signaling configuring the UE or the signaling reconfiguring the UE comprises a medium access control (MAC) control element (CE) or downlink control information (DCI).

Aspect 10: The apparatus of any one of Aspects 1-9, wherein the SRS transmission and PUR occasion resources have a quasi co-location (QCL) relationship.

Aspect 11: The apparatus of Aspect 10, wherein the SRS is transmitted using a transmission beam associated with a receive beam of at least one downlink reference signal.

Aspect 12: The apparatus of any one of Aspect 10 or 11, wherein the signaling configuring the UE with resources for PUR occasions comprises a PUR configuration message, and the QCL relationship is configured via the PUR configuration message.

Aspect 13: The apparatus of Aspect 12, wherein the PUR configuration message is sent via dedicated radio resource control (RRC) signaling or an RRC release message.

Aspect 14: The apparatus of any one of Aspect 12 or 13, wherein the PUR configuration message is sent via a medium access control (MAC) control element (CE) of a downlink message as part of a random access channel (RACH) procedure.

Aspect 15: The apparatus of any one of Aspects 1-14, wherein the apparatus is further configured to send a request for the SRS resources.

Aspect 16: The apparatus of Aspect 15, wherein the request is included in a PUR configuration request.

Aspect 17: The apparatus of any one of Aspect 15 or 16, wherein the request is sent on a physical uplink shared channel (PUSCH), a physical uplink control channel (PUCCH), or uplink control information (UCI) multiplexed with a PUSCH.

Aspect 18: The apparatus of any one of Aspects 15-16, wherein the apparatus is further configured to receive a response indicating a scheduling decision included in a PUR configuration message.

Aspect 19: An apparatus for wireless communications performed by a network entity, comprising a memory and at least one processor coupled to the memory, the memory and the at least one processor being configured to send a UE signaling configuring the UE with resources for PUR occasions and with resources for SRS transmissions, and monitor for SRS in conjunction with one or more of the PUR occasions in accordance with the configuration.

Aspect 20: The apparatus of Aspect 19, wherein the network entity monitors for SRS transmissions multiplexed with data transmitted in the PUR occasions while the UE is an idle or inactive mode.

Aspect 21: The apparatus of Aspect 20, wherein SRS transmissions are multiplexed in the time domain.

Aspect 22: The apparatus of any one of Aspect 20 or 21, wherein the signaling further configures the UE with a transmission time gap between the PUR occasions and the SRS transmissions.

Aspect 23: The apparatus of any one of Aspects 20-22, wherein SRS transmissions are multiplexed in the frequency domain.

Aspect 24: The apparatus of any one of Aspects 19-23, wherein the network entity configures periodicities of the PUR occasions and SRS resources separately.

Aspect 25: The apparatus of any of Aspects 19-24, further comprising sending the UE signaling reconfiguring at least one of the resources for PUR occasions or the resources for SRS transmission.

Aspect 26: The apparatus of any one of Aspects 19-25, wherein at least one of signaling configuring the UE or the signaling reconfiguring the UE comprises dedicated RRC signaling or an RRC release message.

Aspect 27: The apparatus of any one Aspects 19-26, wherein at least one of signaling configuring the UE or the signaling reconfiguring the UE comprises a MAC CE or DCI.

Aspect 28: The apparatus of any one of Aspects 19-27, wherein the SRS transmission and PUR occasion resources have a QCL relationship.

Aspect 29: The apparatus of Aspect 28, wherein the network entity monitors for SRS using a receive beam associated with a transmit beam of at least one downlink reference signal.

Aspect 30: The apparatus of any one of Aspect 28 or 29, wherein the signaling configuring the UE with resources for PUR occasions comprises a PUR configuration message, and the QCL relationship is configured via the PUR configuration message.

Aspect 31: The apparatus of Aspect 30, wherein the PUR configuration message is sent via dedicated RRC signaling or an RRC release message.

Aspect 32: The apparatus of any one of Aspect 30 or 31, wherein the PUR configuration message is sent via a MAC CE of a downlink message as part of a RACH procedure.

Aspect 33: The apparatus of any one of Aspects 19-32, wherein the apparatus is further configured to track uplink timing, based on the monitored SRS.

Aspect 34: The apparatus of any one of Aspects 19-33, wherein the apparatus is further configured to use monitored SRS transmissions to obtain a CSI report from the UE, and perform link adaptation based on the CSI report.

Aspect 35: The apparatus of any one of Aspects 19-34, wherein the apparatus is further configured to calculate one or more position related metrics for the UE, based on the monitored SRS.

Aspect 36: The apparatus of Aspect 35, wherein the position related metrics comprise an uplink TDOA.

Aspect 37: The apparatus of any one of Aspect 35 or 26, wherein the position related metrics comprise an AoA.

Aspect 38: The apparatus of any one of Aspects 19-37, wherein the apparatus is further configured to receive a request for the SRS resources.

Aspect 39: The apparatus of Aspect 38, wherein the request is included in a PUR configuration request.

Aspect 40: The apparatus of any one of Aspect 38 or 39, wherein the request is received on a PUSCH, a PUCCH, or UCI multiplexed with a PUSCH.

Aspect 41: The apparatus of any one of Aspects 38-40, wherein the apparatus is further configured to send a response indicating a scheduling decision included in a PUR configuration message.

Aspect 42: A method for wireless communication by a UE, comprising receiving signaling configuring the UE with resources for PUR occasions and with resources for SRS transmissions, and transmitting SRS in conjunction with one or more of the PUR occasions in accordance with the configuration.

Aspect 43: A computer readable medium having instructions stored thereon for receiving signaling configuring the UE with resources for PUR occasions and with resources for SRS transmissions, and transmitting SRS in conjunction with one or more of the PUR occasions in accordance with the configuration.

Aspect 44: An apparatus for wireless communication by a UE comprising means for receiving signaling configuring the UE with resources for PUR occasions and with resources for SRS transmissions, and means for transmitting SRS in conjunction with one or more of the PUR occasions in accordance with the configuration.

Aspect 45: A method for wireless communication by a UE, comprising sending a UE signaling configuring the UE with resources for PUR occasions and with resources for SRS transmissions, and monitoring for SRS in conjunction with one or more of the PUR occasions in accordance with the configuration.

Aspect 46: A computer readable medium having instructions stored thereon for sending a UE signaling configuring the UE with resources for PUR occasions and with resources for SRS transmissions, and monitor for SRS in conjunction with one or more of the PUR occasions in accordance with the configuration.

Aspect 47: An apparatus for wireless communication by a UE comprising means for sending a UE signaling configuring the UE with resources for PUR occasions and with resources for SRS transmissions, and means for monitoring for SRS in conjunction with one or more of the PUR occasions in accordance with the configuration.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 11 and/or 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

The invention claimed is:

1. An apparatus for wireless communications performed by a user equipment (UE), comprising:

one or more memories comprising executable instructions; and one or more processors configured to execute the executable instructions to cause the UE to:

receive first signaling configuring the UE with resources for pre-configured uplink resource (PUR) occasions and with resources for sounding reference signal (SRS) transmission; and transmit SRS in conjunction with one or more of the PUR occasions in accordance with the configuration, wherein, to transmit the SRS in conjunction with the one or more of the PUR occasions, the one or more processors are configured to cause the UE to multiplex SRS transmissions with information transmitted in the PUR occasions while the UE is an idle or inactive mode.

2. The apparatus of claim 1, wherein SRS transmissions and PUR occasions are multiplexed in a time domain.

3. The apparatus of claim 1, wherein the first signaling further configures the UE with a transmission time gap between the PUR occasions and the SRS transmissions.

4. The apparatus of claim 1, wherein SRS transmissions and PUR occasions are multiplexed in a frequency domain.

5. The apparatus of claim 1, wherein:

periodicities of the PUR occasions and SRS resources are configured separately; and the SRS resources configuration can be periodic, semi-persistent or aperiodic.

6. The apparatus of claim 1, wherein the one or more processors are further configured to cause the UE to receive second signaling reconfiguring the UE with at least one of the resources for PUR occasions or the resources for SRS transmission.

7. The apparatus of claim 6, wherein at least one of the first signaling or the second signaling comprises dedicated radio resource control (RRC) signaling or an RRC release message.

8. The apparatus of claim 6, wherein:

at least one of the first signaling or the second signaling comprises a medium access control (MAC) control element (CE) or downlink control information (DCI); and at least one of the first signaling or the second signaling comprises:

a power control message for the PUR occasion or SRS transmission;

a timing advance tracking message for the PUR occasion or SRS transmission;

a resource allocation re-configuration for the PUR occasion or SRS transmission; or a periodicity re-configuration for the PUR occasion or SRS transmission.

9. The apparatus of claim 1, wherein the SRS transmission and PUR occasion resources have a quasi co-location (QCL) relationship.

10. The apparatus of claim 9, wherein the one or more processors are configured to cause the UE to transmit the SRS using a transmission beam or spatial domain transmission filter associated with a receive beam of at least one downlink reference signal.

11. The apparatus of claim 9, wherein:

the first signaling configuring the UE with resources for SRS and PUR occasions comprises a configuration message; and the QCL relationship is configured via the configuration message.

12. The apparatus of claim 11, wherein the one or more processors are configured to cause the UE to send the configuration message via dedicated radio resource control (RRC) signaling or an RRC release message.

13. The apparatus of claim 11, wherein the one or more processors are configured to cause the UE to send the configuration message via a medium access control (MAC) control element (CE) of a downlink message as part of a random access channel (RACH) procedure.

14. The apparatus of claim 1, wherein the one or more processors are further configured to cause the UE to send a request for on-demand SRS resources configuration.

15. The apparatus of claim 14, wherein the request for on-demand SRS resources configuration is included in a PUR configuration request.

16. The apparatus of claim 14, wherein the one or more processors are configured to cause the UE to send the request for on-demand SRS resources configuration and UE assistance information on a physical uplink shared channel (PUSCH), a physical uplink control channel (PUCCH), or uplink control information (UCI) multiplexed with a PUSCH.

17. The apparatus of claim 14, wherein the one or more processors are further configured to cause the UE to receive a response that indicates a scheduling decision included in a PUR re-configuration message.

18. An apparatus for wireless communications performed by a network entity, comprising:

one or more memories comprising executable instructions; and one or more processors configured to execute the executable instructions to cause the network entity to:

send, to a user equipment (UE), first signaling that configures the UE with resources for pre-configured uplink resource (PUR) occasions and with resources for sounding reference signal (SRS) transmissions; and monitor for SRS in conjunction with one or more of the PUR occasions in accordance with the configuration, wherein, to monitor for the SRS in conjunction with the one or more of the PUR occasions, the one or more processors are configured to cause the network entity to monitor for SRS transmissions multiplexed with information transmitted in the PUR occasions associated with an idle or inactive mode of the UE.

19. The apparatus of claim 18, wherein SRS transmissions are multiplexed in a time domain.

20. The apparatus of claim 18, wherein the first signaling further configures the UE with a transmission time gap between the PUR occasions and the SRS transmissions.

21. The apparatus of claim 18, wherein SRS transmissions are multiplexed in a frequency domain.

22. The apparatus of claim 18, wherein the one or more processors are configured to cause the network entity to configure periodicities of the PUR occasions and SRS resources separately.

23. The apparatus of claim 18, wherein the one or more processors are further configured to cause the network entity to send, to the UE, second signaling that reconfigures at least one of the resources for PUR occasions or the resources for SRS transmission.

24. The apparatus of claim 23, wherein at least one of the first signaling or the second signaling comprises dedicated radio resource control (RRC) signaling or an RRC release message.

25. The apparatus of claim 18, wherein at least one of the first signaling or the second signaling comprises a medium access control (MAC) control element (CE) or downlink control information (DCI).

26. The apparatus of claim 18, wherein the SRS transmission and PUR occasion resources have a quasi co-location (QCL) relationship.

27. A method for wireless communications performed by a user equipment (UE), comprising:

receiving signaling configuring the UE with resources for pre-configured uplink resource (PUR) occasions and with resources for sounding reference signal (SRS) transmissions; and transmitting SRS in conjunction with one or more of the PUR occasions in accordance with the configuration, wherein transmitting the SRS in conjunction with the one or more of the PUR occasions comprises multiplexing SRS transmissions with information transmitted in the PUR occasions while the UE is an idle or inactive mode.

28. A method for wireless communications performed by a network entity, comprising:

sending a user equipment (UE) signaling configuring the UE with resources for pre-configured uplink resource (PUR) occasions and with resources for sounding reference signal (SRS) transmissions; and monitoring for SRS in conjunction with one or more of the PUR occasions in accordance with the configuration, wherein monitoring for the SRS in conjunction with the one or more of the PUR occasions comprises monitoring for SRS transmissions multiplexed with information transmitted in the PUR occasions associated with an idle or inactive mode of the UE.

* * * * *